(12) United States Patent
Brick et al.

(10) Patent No.: US 9,182,531 B2
(45) Date of Patent: Nov. 10, 2015

(54) SURFACE LIGHT GUIDE AND LUMINAIRE

(75) Inventors: Peter Brick, Regensburg (DE); Julius Muschaweck, Gauting (DE)

(73) Assignee: OSRAM AG, Munich (DE)

( * ) Notice: Subject to any disclaimer, the term of this patent is extended or adjusted under 35 U.S.C. 154(b) by 476 days.

(21) Appl. No.: 13/643,060

(22) PCT Filed: Mar. 21, 2011

(86) PCT No.: PCT/EP2011/054226
§ 371 (c)(1),
(2), (4) Date: Jan. 18, 2013

(87) PCT Pub. No.: WO2011/131434
PCT Pub. Date: Oct. 27, 2011

(65) Prior Publication Data
US 2013/0114291 A1    May 9, 2013

(30) Foreign Application Priority Data

Apr. 23, 2010  (DE) .......................... 10 2010 018 028

(51) Int. Cl.
*F21V 7/04*    (2006.01)
*F21V 8/00*    (2006.01)

(52) U.S. Cl.
CPC ............ *G02B 6/0041* (2013.01); *G02B 6/0035* (2013.01); *G02B 6/0061* (2013.01); *G02B 6/0046* (2013.01); *G02B 6/0068* (2013.01)

(58) Field of Classification Search
CPC ... G02B 6/0041; G02B 6/0061; G02B 5/0263
See application file for complete search history.

(56) References Cited

U.S. PATENT DOCUMENTS

| 5,580,932 | A | 12/1996 | Koike |
| 5,881,201 | A | 3/1999 | Khanarian |
| 5,899,552 | A | 5/1999 | Yokoyama et al. |
| 6,206,535 | B1 | 3/2001 | Hattori et al. |
| 6,290,364 | B1 | 9/2001 | Koike et al. |
| 7,368,161 | B2 | 5/2008 | McGurran et al. |
| 2002/0008816 | A1* | 1/2002 | Yano et al. .................... 349/113 |

(Continued)

FOREIGN PATENT DOCUMENTS

| CN | 2594822 Y | 12/2003 |
| CN | 2929744 Y | 8/2007 |
| DE | 102 22 250 A1 | 11/2003 |

(Continued)

OTHER PUBLICATIONS

"Standard Test Method for Haze and Luminous Transmittance of Transparent Plastics[1]," ASTM International, Standard Designation: D 1003-07, Nov. 1, 2007, 7 pages.

*Primary Examiner* — Andrew Coughlin
(74) *Attorney, Agent, or Firm* — Slater & Matsil, L.L.P.

(57) ABSTRACT

In at least one embodiment of the surface light guide, the surface light guide includes at least one scattering element for scattering light. A decoupling coefficient is caused by the scattering element. The decoupling coefficient is set in a varying fashion along a main light-guiding direction. In a direction perpendicular to the main sides of the surface light guide, the opacity value is no more than 0.10, the transmission coefficient is at least 0.75 and the quotient of the minimum light density and maximum light density seen over a continuous emitting area of at least one of the main sides is at least 0.75.

9 Claims, 5 Drawing Sheets

(56) References Cited

U.S. PATENT DOCUMENTS

2003/0198061 A1    10/2003    Chambers et al.
2005/0084993 A1    4/2005    Schmidt et al.

FOREIGN PATENT DOCUMENTS

| | | |
|---|---|---|
| DE | 102 29 064 B4 | 8/2008 |
| EP | 0 939 273 A1 | 9/1999 |
| EP | 1 170 623 A2 | 1/2002 |
| GB | 2 259 176 A | 3/1993 |
| JP | 2003-315560 A | 11/2003 |
| JP | 2008-096982 A | 4/2008 |
| WO | 2007/143432 A2 | 12/2007 |
| WO | WO 2009/116014 A1 | 9/2009 |

* cited by examiner

FIG 2
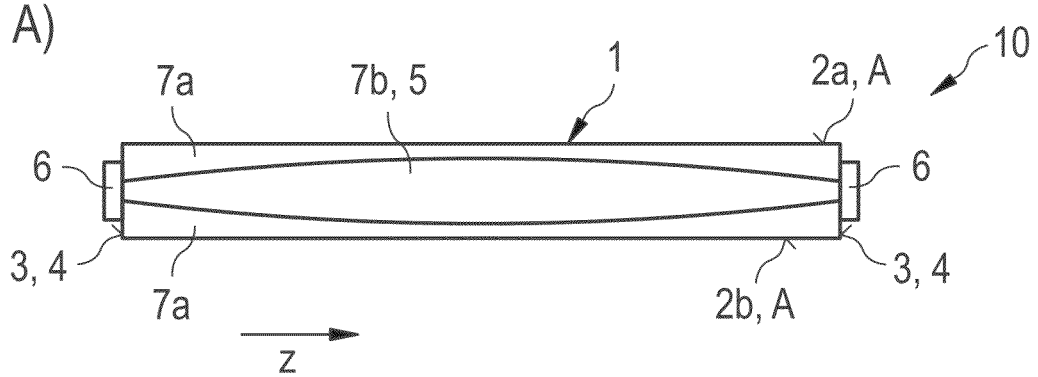
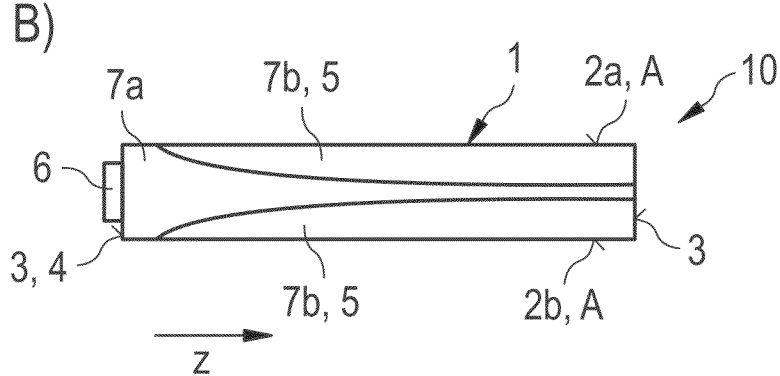
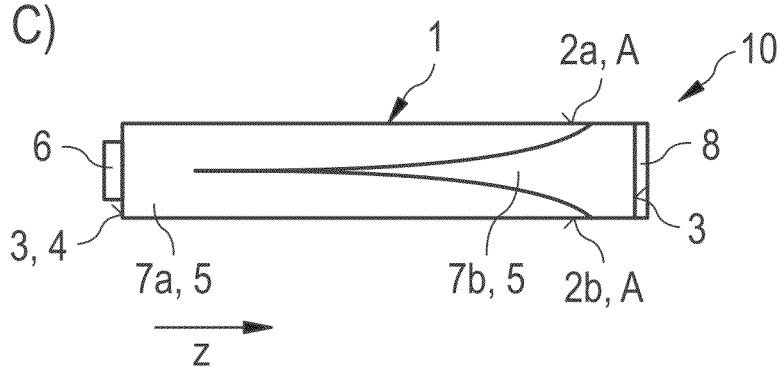

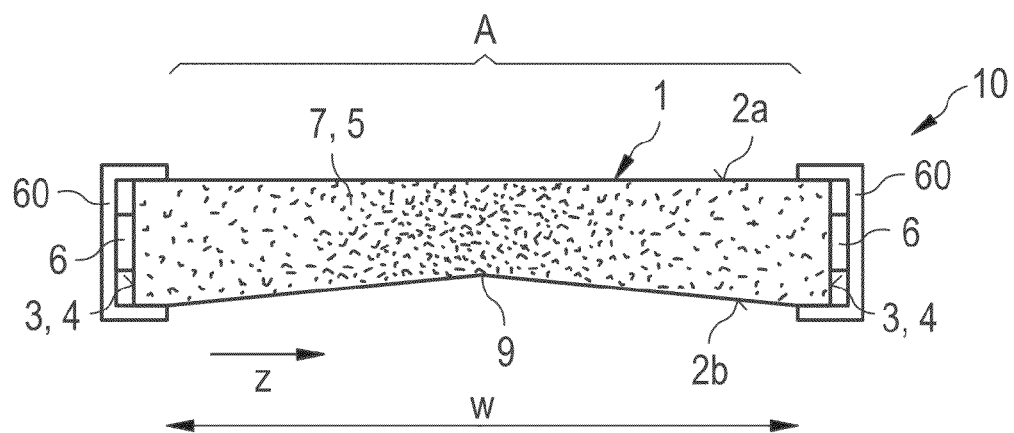
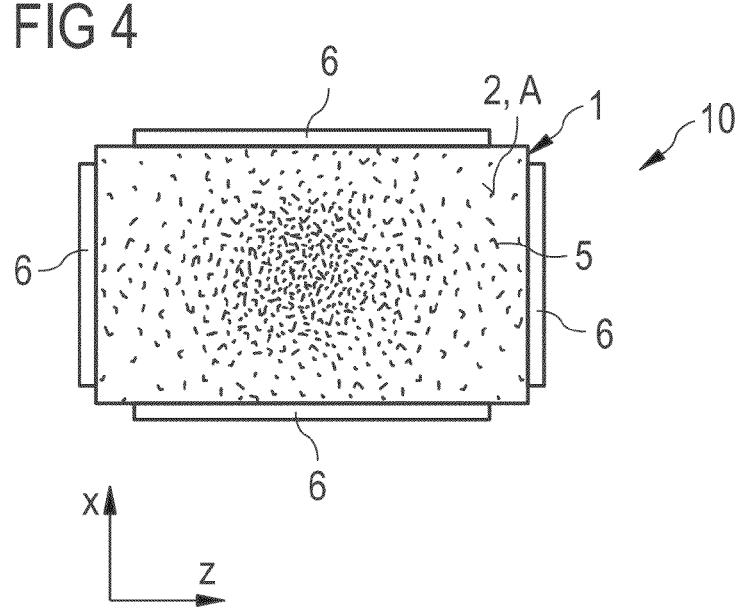

FIG 5
A) 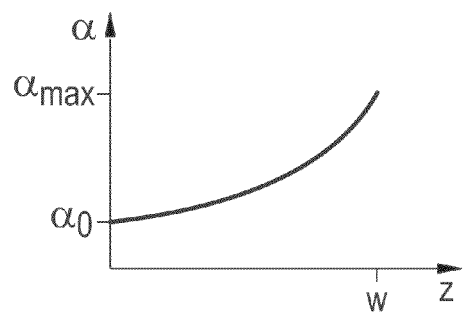
B) 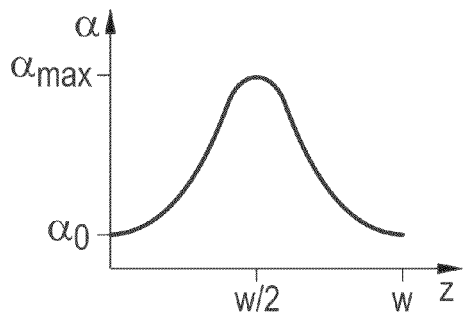

FIG 7
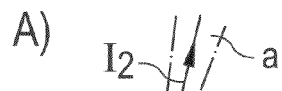
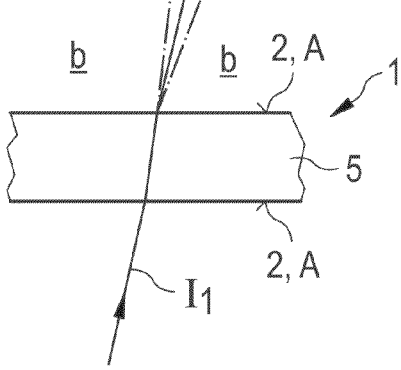
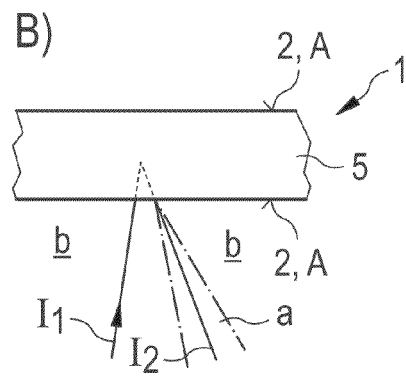
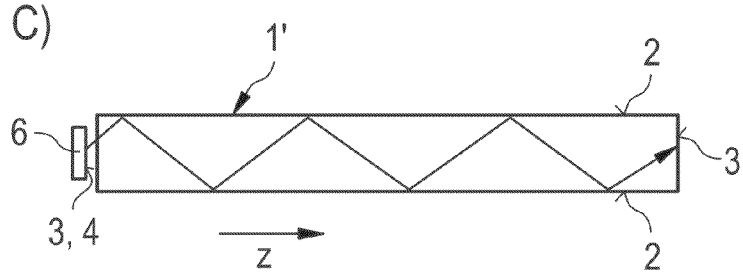
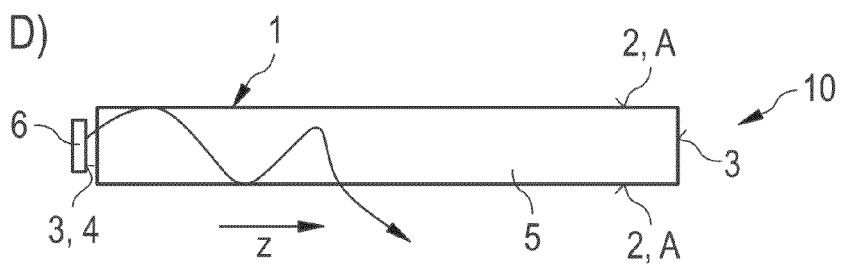
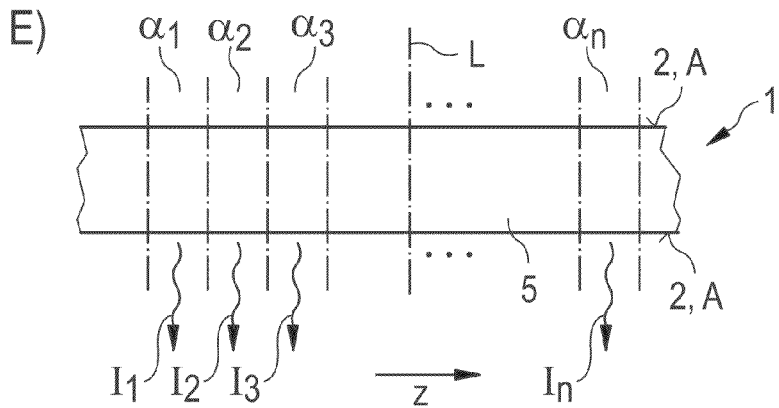

SURFACE LIGHT GUIDE AND LUMINAIRE

This patent application is a national phase filing under section 371 of PCT/EP2011/054226, filed Mar. 21, 2011, which claims the priority of German patent application 10 2010 018 028.9, filed Apr. 23, 2010, each of which is incorporated herein by reference in its entirety.

TECHNICAL FIELD

A surface light guide is specified. Furthermore, a luminaire is specified.

BACKGROUND

A light source element is specified in German patent document DE 102 29 064 A1.

SUMMARY OF THE INVENTION

One aspect of the invention specifies a surface light guide that emits as uniformly as possible, and also a luminaire comprising such a surface light guide.

In accordance with at least one embodiment of the surface light guide, the latter comprises two mutually opposite main sides and at least one end side designed as light entrance side. In this case, the end side is such a boundary area of the surface light guide which connects the opposite main sides to one another. Light entrance side means that this side is provided for coupling in radiation from a light source into the surface light guide via said side.

In accordance with at least one embodiment of the surface light guide, the latter comprises at least one main light guiding direction running away from the light entrance side. The main light guiding direction is therefore such a direction along which the light guide is provided for guiding the light. If a light source is fitted to the light entrance side or to a plurality of light entrance sides, then the main light guiding direction or the main light guiding directions in each case run(s) preferably away from the respective light sources. If a plurality of light sources are fitted to different end sides or light entrance sides, then the surface light guide can comprise a plurality of main light guiding directions which in each case run away from the corresponding light entrance sides, in particular are perpendicular thereto, and which can point in different directions.

In accordance with at least one embodiment of the surface light guide, the latter comprises a scattering means for scattering light. The scattering means has a specific scattering cross section. As a result of the scattering of the light at the scattering means, an angle of the light, relative to the main sides, is altered; in particular, after one or after a plurality of scatterings at the scattering means, light impinges on the main sides at angles which are less than an angle of total internal reflection. As a result, the scattering means cancels the light guiding effect of the surface light guide and thus enables the radiation to be coupled out at the main sides. Therefore, a coupling-out coefficient is also caused by the scattering means. The term scattering means includes, in particular, scattering locations formed by particles and/or by defects and/or by cavities.

In accordance with at least one embodiment of the surface light guide, the coupling-out coefficient is set such that it is not constant along the main light guiding direction. In other words, the light coupling-out coefficient varies in a targeted manner along the main light guiding direction. In this case, a variation of the coupling-out coefficient is attributed exclusively or substantially to a targeted distribution of the scattering means within the surface light guide. Distribution of the scattering means should be understood, in particular, not to mean only statistically governed local concentration fluctuations.

In accordance with at least one embodiment of the surface light guide, the latter has, in particular in a direction perpendicular to at least one of the main sides, a haze value of at most 0.10, preferably of at most 0.05. The haze value is also designated as haziness. The haze value is defined for transmission, for example, as the quotient of that portion of radiation which is scattered upon passing through a medium by an angle of more than 2.5 and the total radiation transmitted by the medium. In other words, the surface light guide is then pellucid or virtually pellucid.

In accordance with at least one embodiment of the surface light guide, the latter has, in particular in a direction perpendicular to at least one of the main sides, a transmission coefficient or a transmission of at least 0.75. The transmission coefficient is preferably at least 85%, in particular at least 90%. In other words, the surface light guide is then transparent or virtually transparent. In this case, the transmission coefficient is the total transmitted light power divided by the incident light power.

In accordance with at least one embodiment of the surface light guide, at least one of the main sides has a continuous emission region provided for emitting light guided in the surface light guide. In other words, the emission region forms an emitting area of the main sides. The emission region preferably extends over the entire main side or over a large part of the main side, for example over more than 90% or over more than 95% of an area of the main side. By way of example, the surface light guide has exactly one emission region per main side.

In accordance with at least one embodiment of the surface light guide, a quotient of a minimum luminance and a maximum luminance, as seen over the at least one emission region, is at least 0.75, preferably at least 0.80 or at least 0.85, in particular if radiation is guided into the surface light guide. In other words, the surface light guide is designed in such a way that radiation coupled into the surface light guide and guided in the surface light guide is coupled out uniformly or substantially uniformly across the entire emission region or across the entire main side.

According to at least one embodiment of the surface light guide, the latter comprises two mutually opposite main sides and at least one end side designed as light entrance side. At least one main light guiding direction runs away from the light entrance side. The surface light guide comprises at least one scattering means for scattering light, wherein a coupling-out coefficient is caused by the scattering means. The coupling-out coefficient is set in a varying fashion along the main light guiding direction. In a direction perpendicular to one of the main sides, a haze value of the surface light guide is at most 0.10, a transmission coefficient is at least 0.75 and a quotient of a minimum luminance and a maximum luminance, as seen across a continuous emission region of at least one of the main sides, is at least 0.75.

If such a surface light guide is provided with a light source, then the at least one emission region of the surface light guide appears uniformly bright during the operation of the light source. When the light source is not in operation, the surface light guide then seems pellucid, for example similar to a window pane, and thus absorbs little radiation, as a result of which a brightness of a room, for example, is increased when the light source is switched off.

In accordance with at least one embodiment of the surface light guide, the coupling-out coefficient α along the main light guiding direction z, with a tolerance of at most 25%, of at most 15% or of at most 10% or of at most 5% of a maximum coupling-out coefficient $α_{max}$, follows one of the following relationships:

$$α(z)=(α_0+k\,z)/(1-α_0 z),$$

or $$α(z)=(α_{max}+k\,z)/(1+α_{max}^2(z-W/2)^2)^{\wedge}0.5.$$

In this case, $α_0$ is a coupling-out coefficient in a partial region of the emission region that is situated closest to the light entrance side, in particular as seen in a plan view of the emission region. W represents an average extent of the emission region along the main light guiding direction z. k is a real number and can be specified, for example, in $m^{-2}$. z is arbitrarily scalable, but preferably has values of between 0 and W inclusive. W, z, k and α can also be specified without units.

In accordance with at least one embodiment of the surface light guide, the latter is molded from at least two or exactly two mutually different basic molding compounds. The basic molding compounds have different average specific coupling-out coefficients. Preferably, the basic molding compounds in the surface light guide are not intermixed. Not intermixed can mean that a boundary region exists between the different basic molding compounds, in which boundary region an average specific coupling-out coefficient within the surface light guide rises in a stepped manner or abruptly, in particular in comparison with remaining regions of the surface light guide. With regard to the coupling-out coefficient, a type of discontinuous phase transition can then be present at a boundary of the basic molding compounds.

Such a surface light guide can be produced, for example, by means of multi-component injection molding, in particular two-component injection molding. The at least two basic molding compounds or the at least two material components during injection molding are preferably processed and/or molded in the same mold. Within the respective basic molding compounds, the scattering means is preferably present in each case in a statistically distributed manner. In other words, no targeted concentration dependence of the scattering means is then set within the basic molding compounds.

In accordance with at least one embodiment of the surface light guide, the latter comprises at least one or exactly one basic molding compound comprising the scattering means. Furthermore, the surface light guide comprises at least one or exactly one basic molding compound that is free of the scattering means. As also in the other embodiments, the basic molding compounds can comprise the same material as a base material, wherein, for example, particles of the scattering means are embedded into one of the basic molding compounds, into the base material acting as matrix material, and the other of the basic molding compounds comprises only the base material. The scattering means is preferably present in the form of particles having an average particle diameter of, in particular, between 10 nm and 30 μm inclusive.

In accordance with at least one embodiment of the surface light guide, the latter comprises at least two or exactly two basic molding compounds, wherein the latter contain different scattering means. Different scattering means is taken to mean that they differ from one another with regard to a material from which the scattering means are molded, or with regard to geometrical characteristic variables of the scattering means, for example an average particle diameter.

In accordance with at least one embodiment of the surface light guide, the latter comprises at least two or exactly two basic molding compounds with which the same scattering means is admixed, wherein the scattering means is present in different concentrations in the basic molding compounds.

In accordance with at least one embodiment of the surface light guide, the latter has exactly one basic molding compound, in which the preferably exactly one scattering means is present in a manner distributed inhomogeneously in a targeted manner. In particular, no discontinuous phase transition or stepped profile of the coupling-out coefficient then occurs within the surface light guide and the basic molding compound. In particular, a concentration of the particles of the scattering means is the highest in a central region of the surface light guide, as seen in plan view, and preferably decreases continuously toward the light entrance sides. In this case, the surface light guide can have a constant, uniform thickness. It is possible that a concentration of the scattering means varies only along the at least one main light guiding direction and is in each case constant, in a direction perpendicular to the main side, within the scope of the production tolerances.

Furthermore, a luminaire is specified. The luminaire comprises, in particular, one or more surface light guides as specified in conjunction with at least one of the embodiments described above. Therefore, features of the luminaire are also disclosed for the surface light guide, and vice versa.

In at least one embodiment of the luminaire, the latter comprises a surface light guide as specified in conjunction with one of the previous embodiments. Furthermore, the luminaire comprises at least one electrically operable light source. The light source is fitted to at least one of the end sides of the surface light guide.

In accordance with at least one embodiment of the luminaire, the latter comprises a plurality of light sources. The light sources are preferably situated at exactly one of the end sides or at exactly two opposite end sides or at exactly four end sides opposite one another in pairs.

In accordance with at least one embodiment of the luminaire, the light sources comprise light emitting diodes or the light sources consist of light emitting diodes and optionally electrical and/or mechanical connections between the light emitting diodes. Preferably, the light emitting diodes are arranged in a strip-like manner along at least one of the end sides.

In accordance with at least one embodiment of the luminaire, the latter emits radiation at both main sides of the surface light guide during operation. In other words, the luminaire is designed to emit light during operation on both sides, preferably with the same intensity or approximately the same intensity. In the switched-off state, the luminaire particularly preferably appears light-transmissive and pellucid in the region of the surface light guide.

BRIEF DESCRIPTION OF THE DRAWINGS

A surface light guide described here and a luminaire described here are explained in greater detail below on the basis of exemplary embodiments with reference to the drawing. In this case, identical reference signs indicate identical elements in the individual figures. In this case, however, relationships to scale are not illustrated; rather, individual elements may be illustrated with an exaggerated size in order to afford a better understanding.

FIGS. 1 to 4 and 7 show schematic illustrations of exemplary embodiments of luminaires and surface light guides described here;

FIG. 5 shows schematic illustrations of a profile of a coupling-out coefficient along a main light guiding direction.

DETAILED DESCRIPTION OF ILLUSTRATIVE EMBODIMENTS

Figure 1:
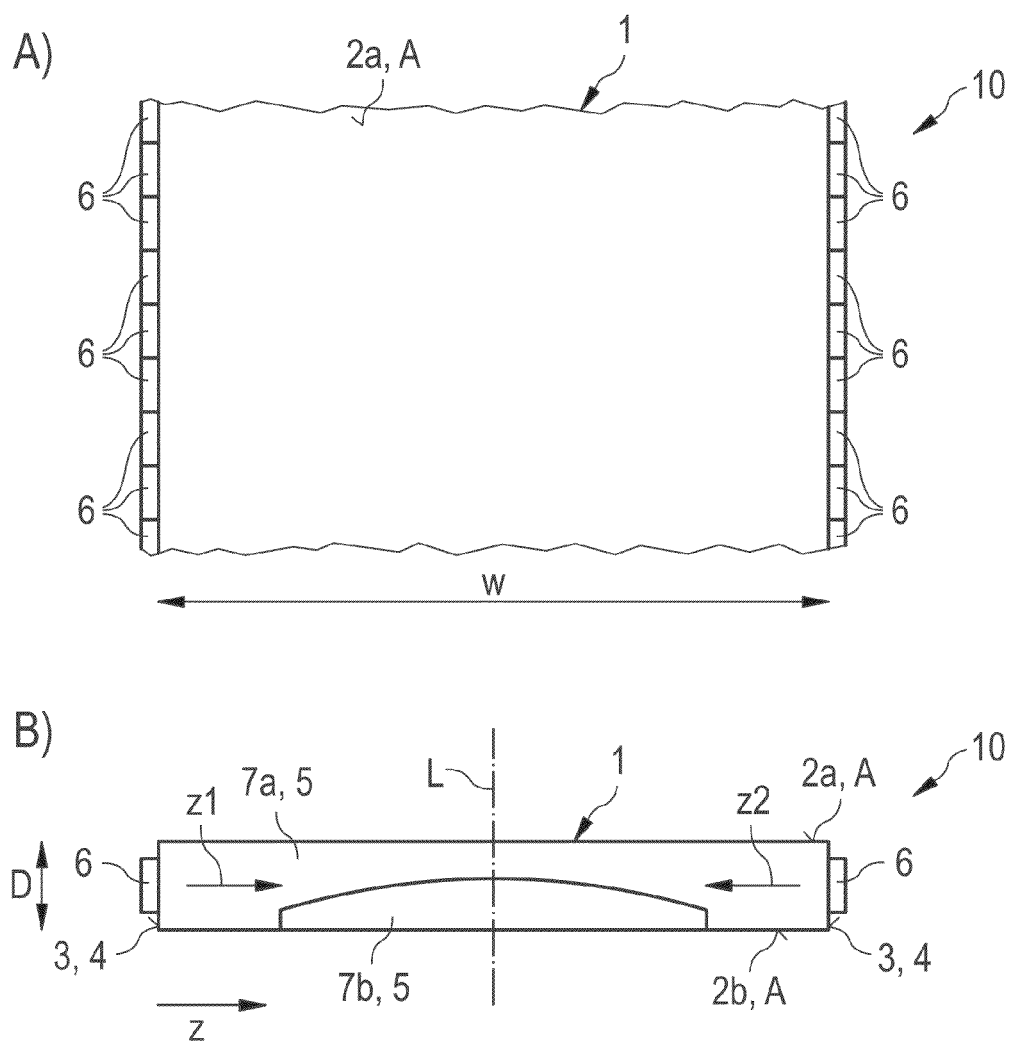

FIG. 1A illustrates a plan view and FIG. 1B a side view of an exemplary embodiment of a luminaire 10 comprising a surface light guide 1. The surface light guide 1 comprises two basic molding compounds 7a, 7b, with each of which a scattering means 5 is admixed. The scattering means 5 is present in the form of particles. An average diameter of the particles is preferably between 0.02 µm and 10 µm inclusive, in particular between 0.1 µm and 6 µm inclusive. The particles of the scattering means 5 consist of or comprise, for example, at least one of the following components: silicon dioxide, titanium dioxide, aluminum oxide, glass, air-filled particles.

The particles of the scattering means 5 are statistically distributed in the basic molding compounds 7a, 7b, which are not intermixed. The basic molding compounds 7a, 7b comprise the same base material, in which the particles of the scattering means 5 are embedded. The base material is or comprises, for example, polymethyl methacrylate, PMMA for short, or polycarbonate, PC for short. Different scattering means 5 are admixed with the base materials of the basic molding compounds 7a, 7b, said scattering means differing from one another in terms of an average particle diameter and/or in terms of a material of the particles. As a result, the basic molding compound 7a has a smaller specific coupling-out coefficient or scattering cross section than the basic molding compound 7b. In other words, the basic molding compound 7a scatters radiation to a lesser extent than the basic molding compound 7b, as a result of which a smaller proportion of radiation is coupled out from the surface light guide 1 through the basic molding compound 7a. Apart from at an interface between the scattering means 5 and the basic molding compounds 7a, 7b or within the scattering means 5, preferably no jump in refractive index of more than 0.1 occurs in the surface light guide 1.

Mutually opposite main sides 2a, 2b of the surface light guide 1 are fashioned as planar and smooth and are arranged parallel to one another. Smooth or optically smooth means, for example, that a change in direction of a local normal vector of the main sides 2a, 2b over a length scale of 1 µm, for example, or 100 µm, for example, is at most 2°. The main sides 2a, 2b are designed over the whole area to emit radiation from the surface light guide 1. An emission region A of the surface light guide 1 therefore extends in each case over the entire main sides 2a, 2b.

The main sides 2a, 2b are connected to one another via end sides 3 embodied in planar fashion. A strip of a multiplicity of light sources 6 formed by light emitting diodes is in each case fitted to the end sides 3. The mutually opposite end sides 3 therefore also constitute light entrances sides 4, via which light is coupled into the surface light guide 1. Optionally, as also in all of the other exemplary embodiments, the light entrance sides 4 can be provided with a roughening or a coating that makes it possible to increase a coupling-in efficiency of radiation into the surface light guide 1.

Main light guiding directions z1, z2 in each case run in a direction away from the light sources 6. A proportion of the more highly scattering basic molding compound 7b increases along the main light guiding directions z1, z2, in a cross section parallel to a perpendicular L to the main sides 2a, 2b.

A maximum proportion of the basic molding compound 7b is present at a central line L. The basic molding compound 7b is molded in a lens-like fashion, as seen relative to the main side 2a and in a cross section. The basic molding compound 7b does not reach as far as the light entrance sides 4. This distribution of the basic molding compound 7b results in a uniform emission of radiation emitted by the light sources 6 across the entire main sides 2a, 2b. The surface light guide 1 can be produced, for example, by means of two-component injection molding, in particular in a so-called continuous tape.

A thickness D of the surface light guide 1 and of the entire luminaire 10 is preferably between 1 mm and 25 mm inclusive, in particular between 2 mm and 15 mm inclusive. A width W of the surface light guide 1 is, for example, more than 50 mm, in particular between 50 mm and 1 m inclusive, for example approximately 150 mm. An area of the emission region A is preferably at least 100 cm$^2$, at least 750 cm$^2$ or at least 2000 cm$^2$.

The electrically operable light sources 6 can be fitted directly to the end sides 3 or to the light entrance sides 4. In contrast to the illustration shown, it is likewise possible for the light sources 6 to be arranged at a distance from the light entrance sides 4, as also in all of the other exemplary embodiments. A distance between the light entrance sides 4 and the light sources 6, in particular a light exit area of the light sources 6, is, for example, between 0.2 mm and 2 mm inclusive, in particular approximately 0.5 mm.

The luminaire 10 in accordance with FIG. 1 is free of further scattering means besides the scattering means 5 embedded in the basic molding compounds 7a, 7b. In particular, the main sides 2a, 2b of the surface light guide 1 are smooth or optically smooth and the surface light guide 1 is not provided with a diffuser film. As seen in a direction parallel to the perpendicular L, therefore, in particular when light sources 6 are switched off, the surface light guide 1 does not seem milky or hazy, but rather pellucid and transparent to an observer.

The pellucidity when light sources 6 are switched off is achieved, in particular, by virtue of the fact that the main sides 2a, 2b are smooth, and that the particles of the scattering means 5 have comparatively small diameters and are not visible to the naked human eye. Furthermore, the surface light guide 1, in the emission region A, is in particular free of structures, such as coupling-out structures, which are visible to the naked human eye.

FIG. 2 illustrates further side views of exemplary embodiments of luminaires 10 and surface light guides 1. In accordance with FIG. 2A, the basic molding compound 7a is free of a scattering means. The scattering means 5 is present exclusively in the basic molding compound 7b, in which the scattering means 5 is distributed uniformly and statistically. The basic molding compound 7b extends in each case as far as the mutually opposite light entrance sides 4. Furthermore, the basic molding compound 7b with the scattering means 5 in each case does not reach the main sides 2a, 2b. In other words, in a direction perpendicular to the main sides 2a, 2b, the basic molding compound 7b with the scattering means 5 is embedded into the basic molding compound 7a without scattering means.

In accordance with FIG. 2B, the basic molding compound 7a is free of a scattering means. The basic molding compound 7b with the scattering means 5 is present in two regions which are separated from one another and which extend in each case away from the main sides 2a, 2b. A proportion of the basic molding compound 7b, as seen in a direction perpendicular to the main sides 2a, 2b, increases monotonically or strictly monotonically along the main light guiding direction z within the scope of the production tolerances. The basic molding compound 7b does not reach as far as the light entrance side 4, but does extend as far as an end side 3 situated opposite the light entrance side 4. The light sources 6 are fitted only to one of the end sides 3, as also in FIG. 2C.

In the exemplary embodiment in accordance with FIG. 2C the scattering means 5 is admixed with both basic molding compounds 7a, 7b, which are not intermixed, wherein the scattering means 5 is preferably the same in both basic molding compounds 7a, 7b and a concentration of the scattering means 5 is higher in the basic molding compound 7b, as a result of which the basic molding compound 7b has a larger specific scattering cross section or specific coupling-out coefficient than the basic molding compound 7a. The basic molding compound 7b widens in a funnel-like manner, as seen in a side view, along the main light guiding direction z. The basic molding compound 7b reaches as far as the main sides 2a, 2b.

A mirror 8 is optionally fitted to the end side 3 situated opposite the light sources 6. The mirror 8 can be fashioned as diffusely or specularly reflective. In contrast to the illustration shown, it is likewise possible for one of the main sides, 2a, 2b to be provided with a preferably specularly, that is to say in accordance with the law of reflection, reflective mirror. In this switched-off state of the light sources 6, the surface light guide 1 then acts as a type of mirror.

In the exemplary embodiment in accordance with FIG. 3, the surface light guide 1 comprises only a single basic molding compound 7, in which the particles of the scattering means 5 are distributed inhomogeneously. Thus, a concentration of the particles of the scattering means 5 is the highest in a central region of the surface light guide 1 and decreases continuously toward the light entrance sides 4.

As in all of the other exemplary embodiments, too, the surface light guide 1 can optionally comprise, in addition to the scattering means 5, one or, in contrast to the illustration shown, a plurality of constrictions 9. The constriction 9 is formed by virtue of the fact that the main side 2b runs at an angle with respect to the main side 2a fashioned as planar. An angle between the main sides 2a, 2b is preferably between 0.5° and 4° inclusive, in particular between 1.25° and 2.5° inclusive. As a result of this small angle between the main sides 2a, 2b, wherein looking through the surface light guide 1, the transmitted radiation is not significantly distorted. In other words, the surface light guide 1 in this case, too, is pellucid and does not cause prism-like distortion.

In accordance with FIG. 3, the light sources 6 are furthermore fixed to the surface light guide 1 by means of a frame 60. The frame 60 is, for example, opaque to light and extends partly onto the main sides 2a, 2b. The emission region A is formed only by those regions of the main side 2a, 2b which are not covered by the frame 60. A corresponding arrangement can also be present in all of the other exemplary embodiments.

In accordance with FIG. 4, the light sources 6 are fitted to all four end sides 3 of the surface light guide 1. As seen in plan view, the surface light guide 1 has a rectangular cross section. As seen in plan view, a concentration of the scattering means 5 is the highest in a central region of the surface light guide 1 and the lowest in corner regions of the surface light guide 1. The light sources 6 preferably in each case do not reach as far as corners of the surface light guide 1.

FIGS. 5A and 5B illustrate a profile of the coupling-out coefficient α along the main light guiding direction z. In accordance with FIG. 5A, the coupling-out coefficient α increases continuously. Such a profile of the coupling-out coefficient α is preferably used in the exemplary embodiments in accordance with FIGS. 2B and 2C. A profile of the coupling-out coefficient α that is like a bell-shaped curve according to FIG. 5B is present, in particular, in the exemplary embodiments in accordance with FIGS. 1, 2A and 3.

Figure 6:
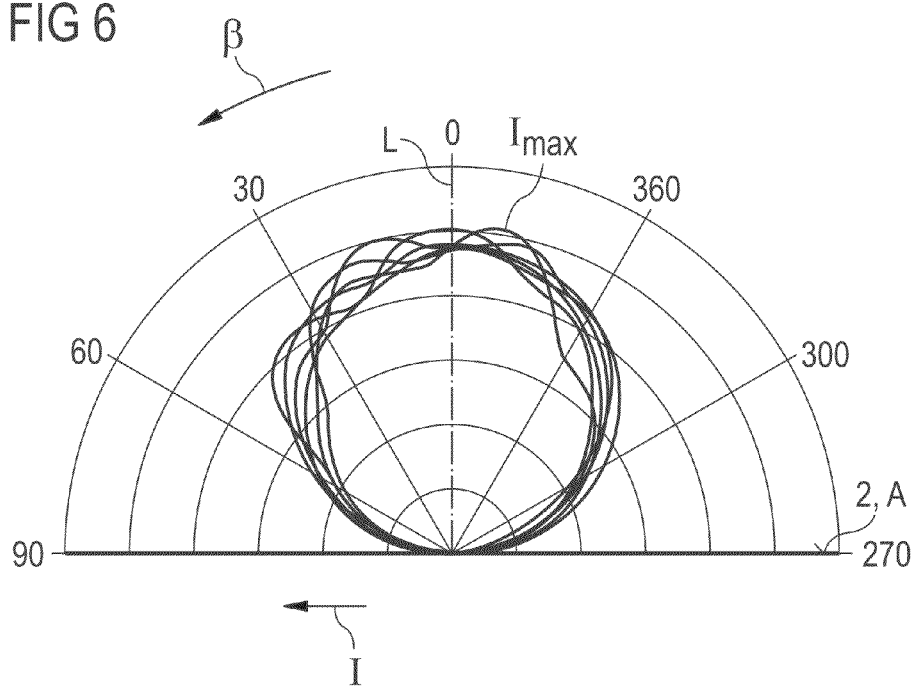
FIG. 6 shows a schematic illustration of an angle-dependent emission characteristic of a surface light guide described here.

FIG. 6 illustrates an angle-dependent emission of the surface light guide 1 for instance in accordance with FIGS. 1 to 4. A direction-dependent emission intensity I is plotted relative to an emission angle β, in relation to the perpendicular L to the main sides 2 or to the emission region A. A maximum intensity $I_{max}$ is present within an angle range of +/−20° with respect to the perpendicular L. A maximum intensity I in an angle range comprising angles of >70° with respect to the perpendicular L is at most 0.5, preferably at most 0.3, of the maximum intensity $I_{max}$. The emission characteristic obtained with the surface light guide 1 corresponds, in particular with a tolerance of at most 20% or of at most 10% of the maximum intensity $I_{max}$, to the emission characteristic of a Lambertian emitter.

FIG. 7 illustrates the functioning of the surface light guide 1 in greater detail. The features of FIG. 7 that are related to the surface light guide 1 and/or to the luminaire 10 can analogously be applied to all of the other exemplary embodiments and are therefore disclosed for the latter as well.

FIG. 7A clarifies the haze value for transmission. The haze value is equal to the quotient of the radiation proportion $I_2$ emitted into the angle range a and the total transmitted intensity. Those rays which, upon passing through the surface light guide 1, experience a directional deviation of <2.5°, relative to an ideally transmissive, plane-parallel plate, are deemed not to be scattered. The angle range a deemed not to be scattered is demarcated in FIG. 7A by a dash-dotted line from an angle range b, in which the transmitted rays are deemed to be scattered or slightly scattered. The haze value is defined, in particular, for radiation impinging on the main sides 2 perpendicularly or virtually perpendicularly. A corresponding illustration is given for reflection in FIG. 7B.

FIG. 7C shows a modified light guide 1', with which no scattering means is admixed. Proceeding from the light source 6, the radiation remains substantially with uniform intensity along the main light guiding direction z into the light guide 1', see FIG. 7C. As a result of the scattering means 5 into the surface light guide 1, see FIG. 7D, the radiation emitted by the light source 6 increasingly experiences scattering along the main light guiding direction z, such that an angle of the radiation, relative to the main sides 2, is increased along the main light guiding direction z, such that the radiation can be coupled out.

In accordance with FIG. 7E, the main sides 2 are subdivided into fictitious sections of identical size. The individual sections, passing through the surface light guide 1 in a direction perpendicular to the main sides 2, have lateral dimensions which have, for example, at most 1/20 or at most 1/100 of the width W of the emission region A. An emission intensity I is approximately identical in each of the sections. The coupling-out coefficients α are to be specified, for example, in a manner averaged over each of the sections. Along the main light guiding direction z, cf. in particular FIG. 5A and the exemplary embodiments in accordance with FIGS. 2B and 2C, the coupling-out coefficients α increase continuously, for example. As a result of the averaging of the coupling-out coefficients α and the emission intensities I over comparatively large sections of the surface light guide 1, statistical fluctuations of the concentration of the scattering means 5 are averaged out in this manner of consideration.

The invention described here is not restricted by the description on the basis of the exemplary embodiments. Rather, the invention encompasses any novel feature and also any combination of features, which in particular includes any combination of features in the patent claims, even if this feature or this combination itself is not explicitly specified in the patent claims or exemplary embodiments.

The invention claimed is:

1. A surface light guide comprising:
two mutually opposite main sides,
an end side designed as light entrance side,
a main light guiding direction running away from the light entrance side, and
a scattering element in the form of particles and configured to scatter light, wherein a coupling-out coefficient caused by the scattering element is set in a varying fashion along the main light guiding direction,
wherein, in each case in a direction perpendicular to one of the main sides:
a haze value of the surface light guide is at most 0.10,
a transmission coefficient of the surface light guide is at least 0.75, and
a quotient of a minimum luminance and a maximum luminance across at least one continuous emission region of at least one of the main sides is at least 0.75,
wherein the surface light guide has a rectangular cross section and exactly one basic molding compound in which the scattering element is present and distributed inhomogeneously in a targeted manner so that a concentration of the scattering element is the highest in a central region of the surface light guide and the lowest in corner regions of the surface light guide as seen in a plan view,
wherein the main sides are each planar and smooth at least in the emission region so that there is at most one constriction that is located in a center of the surface light guide when seen in top view, and
wherein an angle between the main sides is between 0.5 degrees and 4.0 degrees inclusive.

2. The surface light guide according to claim 1, wherein a coupling-out coefficient $\alpha$, with a tolerance of at most 5% of a maximum coupling-out coefficient $\alpha_{max}$, follows one of the following relationships along the main light guiding direction z:

$$\alpha(z)=\alpha_0/(1-\alpha_0 z),$$

$$\alpha(z)=(\alpha_{max}+k\,z)/(1+\alpha_{max}^2(z-W/2)^2)^{0.5},$$

wherein $\alpha_0$ is a coupling-out coefficient in a region of the emission region situated closest to the light entrance side, W is an average extent of the emission region along the main light guiding direction z and k is a real number.

3. The surface light guide according to claim 1, wherein an average particle diameter is between 10 nm and 30 µm, inclusive.

4. The surface light guide according to claim 1, wherein an emission intensity for an angle in an angle range of greater than 70°, relative to a direction perpendicular to one of the main sides, is at most 50% of a maximum emission intensity for an angle in an angle range of at most 70° with respect to said direction.

5. The surface light guide according to claim 1, wherein the surface light guide has a thickness of between 1 mm and 25 mm inclusive.

6. The surface light guide according to claim 1, wherein the emission region has an area of at least 100 cm².

7. A luminaire comprising:
at least one surface light guide according to claim 1; and
a plurality of electrically operable light sources,
wherein the light sources are fitted to all four end sides of the rectangular-shaped at least one surface light guide.

8. The luminaire according to claim 7, wherein the light sources comprise light emitting diodes, wherein the light emitting diodes are arranged in at least one strip.

9. A surface light guide comprising:
two mutually opposite main sides,
at least one end side designed as light entrance side,
at least one main light guiding direction running away from the light entrance side, and
at least one scattering element for scattering light, wherein a coupling-out coefficient caused by the at least one scattering element is set in a varying fashion along the main light guiding direction,
wherein, in each case in a direction perpendicular to one of the main sides,
a haze value of the surface light guide is at most 0.10,
a transmission coefficient of the surface light guide is at least 0.75, and
a quotient of a minimum luminance and a maximum luminance across at least one continuous emission region of at least one of the main sides is at least 0.75,
wherein the surface light guide has exactly one basic molding compound, in which the scattering element is present and distributed inhomogeneously in a targeted manner,
wherein the scattering element is present in the form of particles,
wherein the main sides are in each case planar and smooth at least in the emission region so that there is at most one constriction, and
wherein an angle between the main sides is between 0.5° and 4.0° inclusive.

* * * * *